United States Patent
Woody et al.

(10) Patent No.: US 9,229,971 B2
(45) Date of Patent: Jan. 5, 2016

(54) MATCHING DATA BASED ON NUMERIC DIFFERENCE

(75) Inventors: Jeffrey Woody, Onalaska, WI (US); Abhiram Gujjewar, San Ramon, CA (US); Mark Spiess, La Crosse, WI (US)

(73) Assignee: Business Objects Software Limited, Dublin (IE)

( * ) Notice: Subject to any disclaimer, the term of this patent is extended or adjusted under 35 U.S.C. 154(b) by 1356 days.

(21) Appl. No.: 12/973,961

(22) Filed: Dec. 21, 2010

(65) Prior Publication Data

US 2012/0158807 A1 Jun. 21, 2012

(51) Int. Cl.
*G06F 17/30* (2006.01)
(52) U.S. Cl.
CPC ...... *G06F 17/30371* (2013.01); *G06F 17/3015* (2013.01)
(58) Field of Classification Search
USPC .................................. 707/664, 692; 708/671
See application file for complete search history.

(56) References Cited

U.S. PATENT DOCUMENTS

| | | | |
|---|---|---|---|
| 6,981,008 B2 * | 12/2005 | Tabuchi et al. ............... 707/692 |
| 7,577,653 B2 * | 8/2009 | Dasari et al. ............... 1/1 |
| 7,587,423 B2 * | 9/2009 | Kalthoff et al. ............... 1/1 |
| 7,627,550 B1 * | 12/2009 | Adams et al. ............... 1/1 |
| 7,827,153 B2 | 11/2010 | Werner et al. |
| 7,903,114 B2 | 3/2011 | Sagalov |
| 8,131,685 B1 * | 3/2012 | Gedalius et al. ............ 707/662 |
| 8,244,689 B2 * | 8/2012 | Betz et al. ............... 707/692 |
| 2003/0041059 A1 * | 2/2003 | Lepien ............... 707/5 |
| 2007/0203939 A1 * | 8/2007 | McArdle ............... 707/102 |
| 2008/0040373 A1 * | 2/2008 | Kuehmichel et al. ......... 707/101 |
| 2010/0175024 A1 * | 7/2010 | Schumacher et al. ........ 715/810 |
| 2010/0257145 A1 | 10/2010 | Felsheim |
| 2012/0059827 A1 * | 3/2012 | Brittain et al. ............... 707/741 |

OTHER PUBLICATIONS

Business Objects, "Data Services Designer Guide", BusinessObjects Data Services XI 3.1 (12.1.1), Nov. 28, 2008.*
Business Objects, "Data Services Reference Guide", BusinessObjects Data Services XI 3.1 (12.1.1), Nov. 28, 2008.*
A. K. Elmagarmid, P. G. Ipeirotis, "Duplicate Record Detection: A Survey", IEEE Transactions on Knowledge and Data Engineering, vol. 19, No. 1, Jan. 2007.*
Business Objects, "Data Services Tutorial", BusinessObjects Data Services XI 3.1 (12.1.1), Nov. 28, 2008.*
Business Objects, "Data Services Management Console: Metadata Reports Guide" BusinessObjects Data Services XI 3.1 (12.1.1), Nov. 28, 2008.*

(Continued)

*Primary Examiner* — Chuong D Ngo
*Assistant Examiner* — Matthew Sandifer

(57) ABSTRACT

Systems and methods for matching data based on numeric difference are described herein. Input data elements are parsed to identify a first number and a second number. A difference between the first number and the second number is calculated based on a predefined formula. Based on the difference, a matching score between the input data elements is evaluated. The matching score is proportional to a base matching score corresponding to a threshold difference, and a maximum score corresponding to a match between the first number and the second number. A similarity between the input data elements is reported based on the evaluated matching score.

20 Claims, 7 Drawing Sheets

(56) References Cited

OTHER PUBLICATIONS

Henry B. Kon, Stuart E. Madnick and Michael D. Siegel; Good Answers from Bad Data: a Data Management Strategy; Proceedings of the 5th International Workshop on Information Technologies and Systems, 1995; Sloan School of Management, Massachusetts Institute of Technology (MIT), Cambridge, MA (USA); (http://citeseerx.ist.psu.edu/viewdoc/download?doi=10.1.1.92.2413&rep=rep1&type=pdf).

M. Cochinwala, S. Dalal, A. K. Elmagarmid and V. S. Verykios; Record Matching: Past, Present and Future; Technical Report CSD-TR #01-013, Department of Computer Sciences, Purdue University, West Lafayette, IN (USA); Jul. 2001 (http://www.cs.purdue.edu/research/technical_reports/2001/TR%2001-013.pdf).

Clifton Phua, Vincent Lee, Kate Smith and Ross Gayler; A Comprehensive Survey of Data Mining-based Fraud Detection Research; Victoria, 1-14; arXiv—Cornell University, Ithaca, NY, USA; 2005 (http://arxiv.org/pdf/1009.6119).

Peter Burns and Anne Stanley; Fraud Management in the Credit Card Industry; Payment Cards Center Discussion Paper No. 02-05 (Apr. 2002); Federal Reserve Bank of Philadelphia, Philadelphia, PA (USA); (http://www.philadelphiafed.org/payment-cards-center/publications/discussion-papers/2002/FraudManagement_042002.pdf).

Bolton, R.J. and Hand, D.J.; Statistical Fraud Detection: A Review; Statistical Science, vol. 17 Issue 3, pp. 235-255; Institute of Mathematical Statistics, Beachwood, OH (USA); 2002 (http://projecteuclid.org:80/Dienst/getRecord?id=euclid.ss/1042727940/).

\* cited by examiner

MATCHING DATA BASED ON NUMERIC DIFFERENCE

BACKGROUND

The main objective of virtually every business organization is to be profitable. In knowledge based economy, one of the major success factors is competent information management. Enormous amounts of data are created daily, and the ability to efficiently work with information is key for a company to propel and to emerge to a position of strength. One of the aspects in information management concerns process execution and the decrease of operational costs. Usually, without elaborated information management strategy, the quality of the generated data in a company decreases. Hence, the adopted business processes and initiatives are negatively affected. Incorrect or out-of-date information about customers, partners, and products result in time loss, discredited credibility with customers, frustration in supply chain, etc. Another aspect aims at ensuring trustfulness in the data generated and stored across the landscape of a business organization. The confidence in the available information enables the stakeholders in an organization to work efficiently, and accurately. Generally, there are many sources of information which create data redundancy and duplications, e.g., daily data entries by different stakeholders, data migrations, legacy systems data, data acquired as a result of mergers and acquisitions, etc. Therefore, the businesses need to follow stringent rules for data consolidation and data cleaning.

There are various software products and tools available for data management that are developed to help understanding the complex and multidimensional relationships in the enterprise data. Such products provide efficient handling of customer and business data elements among different applications, including business intelligence (BI), enterprise resource planning (ERP) systems, middleware applications, etc. One of the most important functions of data management is the ability to detect, match and consolidate duplicate data, leveraging multiple data sources for analytical or operational needs. Therefore, the availability of efficient data matching algorithms is essential for a quality information management. However, in many cases the data management products fail to identify data redundancy or inconsistency. For example, when comparing string data elements, the actual characters of the data elements are simply matched. The data elements may contain similar, even duplicate information, presented or described with different sets of characters. Thus, such similar data elements remain undetected.

SUMMARY

Various embodiments of systems and methods for matching data based on numeric difference are described herein. In one aspect, a first input data element is parsed to identify at least one numerical character. Similarly, a second input data element is parsed to identify at least one second numerical character. The numerical characters identified in the first and second input data elements are converted to a first number and to a second number, respectively. In another aspect, a difference between the first number and the second number is calculated based on a predefined formula. In yet another aspect, a matching score between the first input data element and the second input data element is evaluated based on the calculated difference. The matching score is proportional to a base matching score corresponding to a threshold difference, and a maximum score corresponding to a match between the first number and the second number. A similarity between the first input data element and the second input data element is reported based on the evaluated matching score.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for matching data based on numeric difference are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
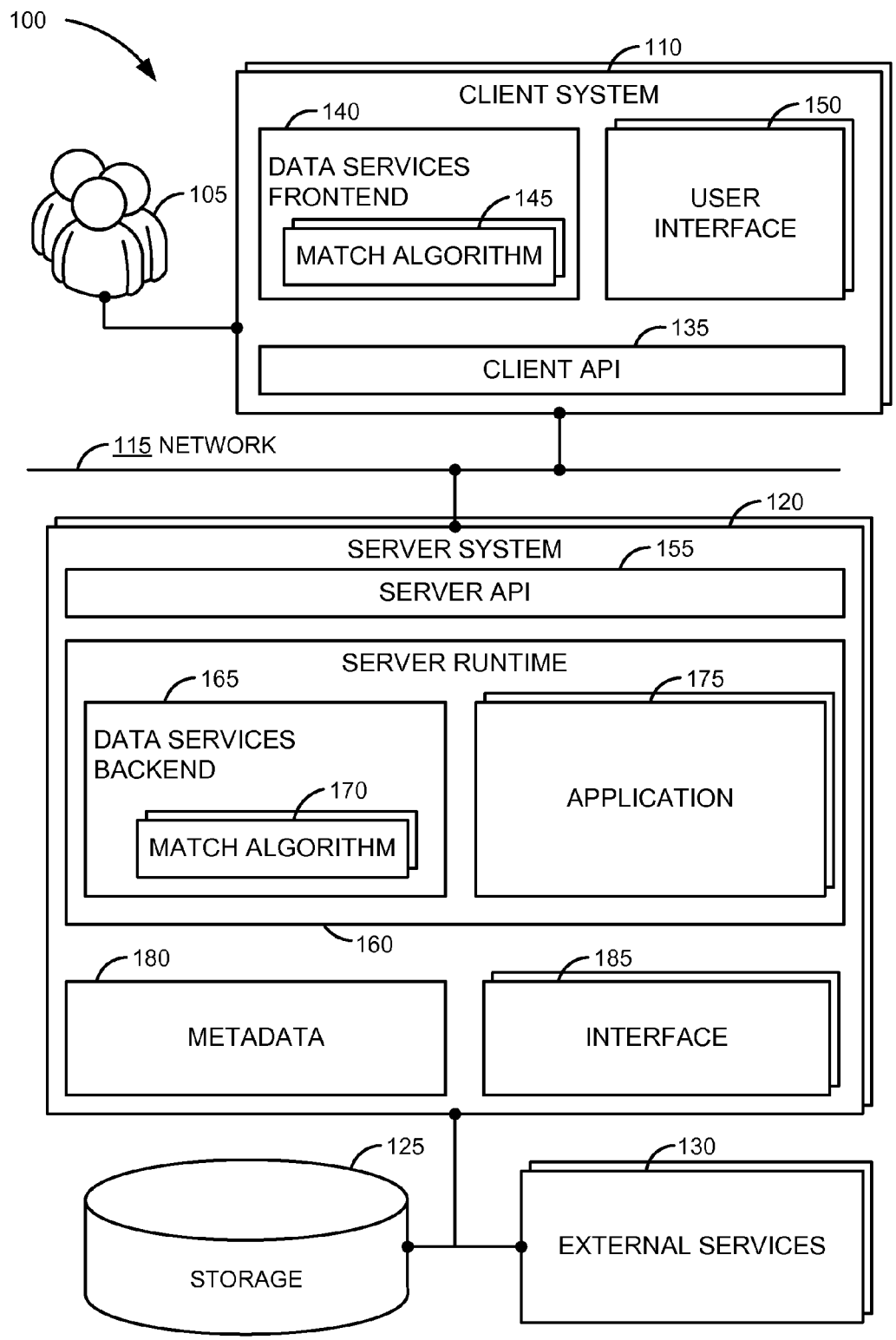
FIG. 1 is a block diagram illustrating a computer system where data matching functionality is implemented, according to one embodiment.

System 100 in FIG. 1 provides a simplified example of an enterprise computer system environment, where data matching functionality is implemented, according to one embodiment. The system 100 includes at least one client system 110 communicating with server system 120 via network 115. Generally, users 105 access client system 110 to configure and operate with various software services provided by one or more software applications deployed in the server system 120. The server system 120 may be built to run one or more application server instances on one or more physical hardware server systems. The server system 120 may be configured as a cluster when more than one application server instances or/and physical hardware servers are included.

The client system 110 may represent a variety of processing devices, e.g., desktop computers, laptops, cellular phones, handheld devices (for example, personal digital assistant (PDA)), navigation devices, etc. Each of users 105 may access one or more sessions of user interface (UI) 150 to operate with the available software services. The client system 110 provides an environment where client side software applications are deployed and executed to provide functionality necessary for accessing the software services at the server system 120. For example, some client side software applications may pre-process service requests initiated through UI 150. Other client side software applications can be used in designing new, or changing existing software services at the server systems 120. Data services frontend 140 is an example for a client side application implemented in the at least one client system 110 to execute data matching algorithm 145 to evaluate data similarities, according to one embodiment.

The client system 110 establishes interface with server system 120 using appropriate functions, methods and data formatting as defined by client application programming interface (API) 135. In one embodiment, the different elements of the client system 110, e.g., UI 150, data services frontend 140 and client API 135, are implemented within a common framework. For example, an Internet browser could provide such a common framework. The additional functionality required for the described is plug-ins, or other extensions, e.g., Silverlight™ development platform provided by Microsoft Corporation. Other examples for such frameworks may include Java™ Virtual Machine (JVM) originally specified by Sun Microsystems, Inc.; .Net™ Framework specified by Microsoft Corporation, etc.

The modules of server system 120 correspond to some of the basic elements included in general application server architecture. Server runtime 160 establishes environment where one or more software applications 175 are deployed and executed. The access to the services provided by applications 175 is managed through server API 155. In one embodiment, metadata component 180 represents data structures where the application server stores descriptions of programming or business objects, and/or different parameters relevant to the deployed applications 175. The metadata 180 could be accessed by the server runtime 160 during the deployment and the execution of the applications 175. In one embodiment, the server system 120 is built using Java™ based application server platform, e.g., compliant with Java Enterprise Edition (Java EE™) specification. The elements of the server system 120 could be executed within a server side JVM.

Interfaces 185 provide the server system 120 with access to external resources. External services 130 represent an example for such external resources. The external services 130 may be available at other computer systems connected to the server system 120 directly, via network 115, or via other networks. The external services 130 may include business services provided by legacy systems, infrastructure services, messaging or notification services, etc.

Storage 125 is another example for external resources. The storage 125 could include one or more databases, where any of the software and hardware elements of the server system 120, including the physical servers and the application server instances, may extract and store data. The external services 130 may also store and extract data from the storage 125. The data that is placed in the storage 125 could be shared among the different system nodes, including the server system 120 units, the providers of the external services 130, and also including computer systems from other system landscapes.

In one embodiment, matching functionality is implemented in the computer system for evaluating similarity between data elements. The data elements that are compared could be provided in the computer system 100 by different sources, including users 105, the at least one client system 110, the elements of the server system 120 (e.g., stored in the metadata 180, or received at interfaces 185), the external services 130, the storage 125, etc. In one embodiment, the implementation of such matching functionality or mechanism in the computer system 100 includes the data services frontend 140 and the data services backend 165, where the matching algorithms 145 and 170 are executed, respectively. In an alternative embodiment, data matching mechanism includes either only frontend implementation or backend implementation.

The setup and execution management of the data services backend 165 could be administered through data services frontend 140. The responsible users 105 who are authenticated with respective privileges at client system 110 may access the data services frontend 140 through a session of the UI 150. The data services frontend 140 may include various controls for setup and management of the execution of the matching mechanism implemented in the system 100, e.g., configuring and executing the match algorithms 145 and 170. Further, the data services frontend 140 may include functionality for processing, analyzing and presenting the results of data management performed by the data services backend 165. The responsible users 105 may setup the type of analyses to be performed, the way the data matching results are to be presented, etc.

The data services backend 165 could be deployed and executed in the server runtime environment 160. In one embodiment, the data services backend 165 may be integrated with the server runtime 160, e.g., developed as an integral part or enhancement of the JVM.

There are different scenarios for information management where data matching mechanism is applied to evaluate the similarity between data elements or data objects. For example, data matching is used in identity resolution, to prevent duplicate records when adding new customers or other entities to a master database, e.g. in customer relationship management (CRM) applications, ERP systems, etc. The data matching mechanism may also be used for checking the data already placed in a master database to detect any inconsistencies and duplicates on various levels, for example in personal or corporate data separated by households, families, individuals, addresses, departments, etc.

In one embodiment, the process of matching data elements identifies duplicate records in multiple data sources, e.g., tables, files, messages, etc. An efficient matching mechanism may compare data elements in different directions, and then join the intersections in a single record. The data elements, e.g., data records, could be compared by mapping various fields holding similar kinds of information, like name, phone number, account number, operational data, product ID, description user defined fields, etc.

Data consolidation is another area where data matching mechanisms are used, according to one embodiment. A data consolidation process may eliminate, filter or combine duplicate records by applying configurable matching rules. For example, the goal of data consolidation may be to build the "best record" based on the available data by selecting information from multiple data fields according to set priorities, e.g., source, frequency, completeness, recency, etc. The match and consolidation processes may build reference keys based on the identified data similarities to track individual records and their associations across multiple databases.

Figure 2:
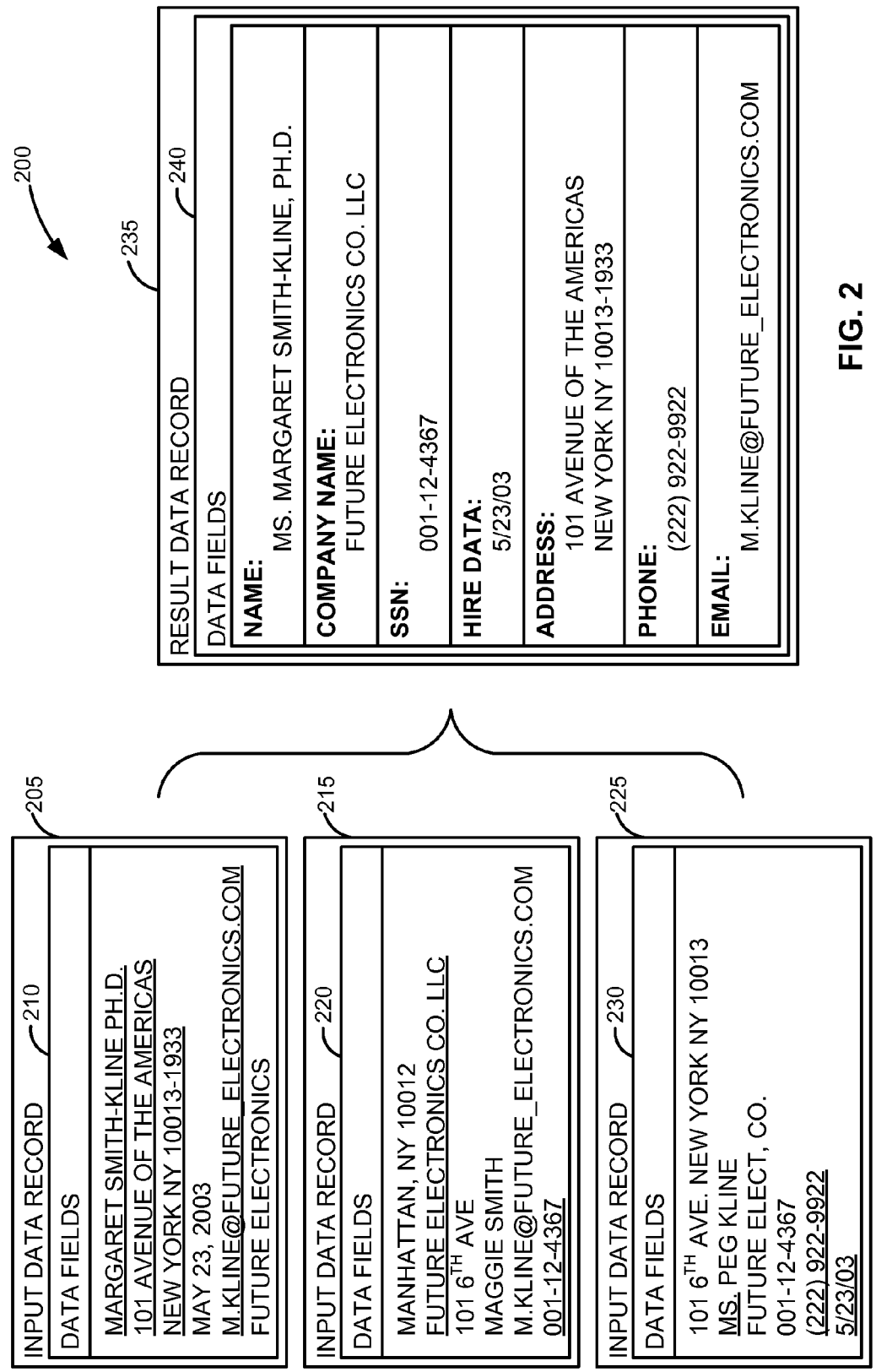
FIG. 2 is a block diagram illustrating a match between tree data records, according to one embodiment.

FIG. 2 illustrates matching 200 between three separate data records available in a computer system environment, according to one embodiment. Input data records 205, 215 and 225 are identified as duplicated by a matching mechanism based on one or more matching algorithms applied. Result data record 235 is created or built to consolidate the data available in the original data records, and to eliminate the duplications. Each of the original data records 205, 215 and 225 stores various types of information in data fields 210, 220 and 230, respectively. The matching mechanism identifies data fields storing similar information based on applying various matching algorithms. The best data among the similar inputs is selected and consolidated in the structured data fields 240 of the result data record 235.

The data in result data record 235 could be salvaged and posted to form a single best record, e.g., a "master" record. Then, the original input data records 205, 215 and 225 could be archived, or directly removed from the computer system. In FIG. 2, the data selected from input records 205, 215 and 225 is illustrated by underlining the respective entries in data fields 210, 220 and 230. Alternatively, the result data record 235 could be posted to update the matching input data records 205, 215 and 225. "Master" records or fields can be defined in a consolidation process to align with predefined business rules. For example, a rule may require the most current phone number to be posted to all three input records 205, 215 and 225.

Regardless how the similar or duplicate data are processed in a computer system landscape, the main objective of every data matching mechanism is the identification of such data. There are different criteria for matching data elements based on different definitions of similar or duplicate data. Data elements that look different could be treated as duplicate for specific purposes, users and scenarios. For example, differently spelled names or addresses could be treated as identical, e.g., "William" and "Bill", "First street" and "$1^{st}$ Street", "International Business Machines" and "IBM", "Metlife" and "Metropolitan Life", etc.

Figure 3:
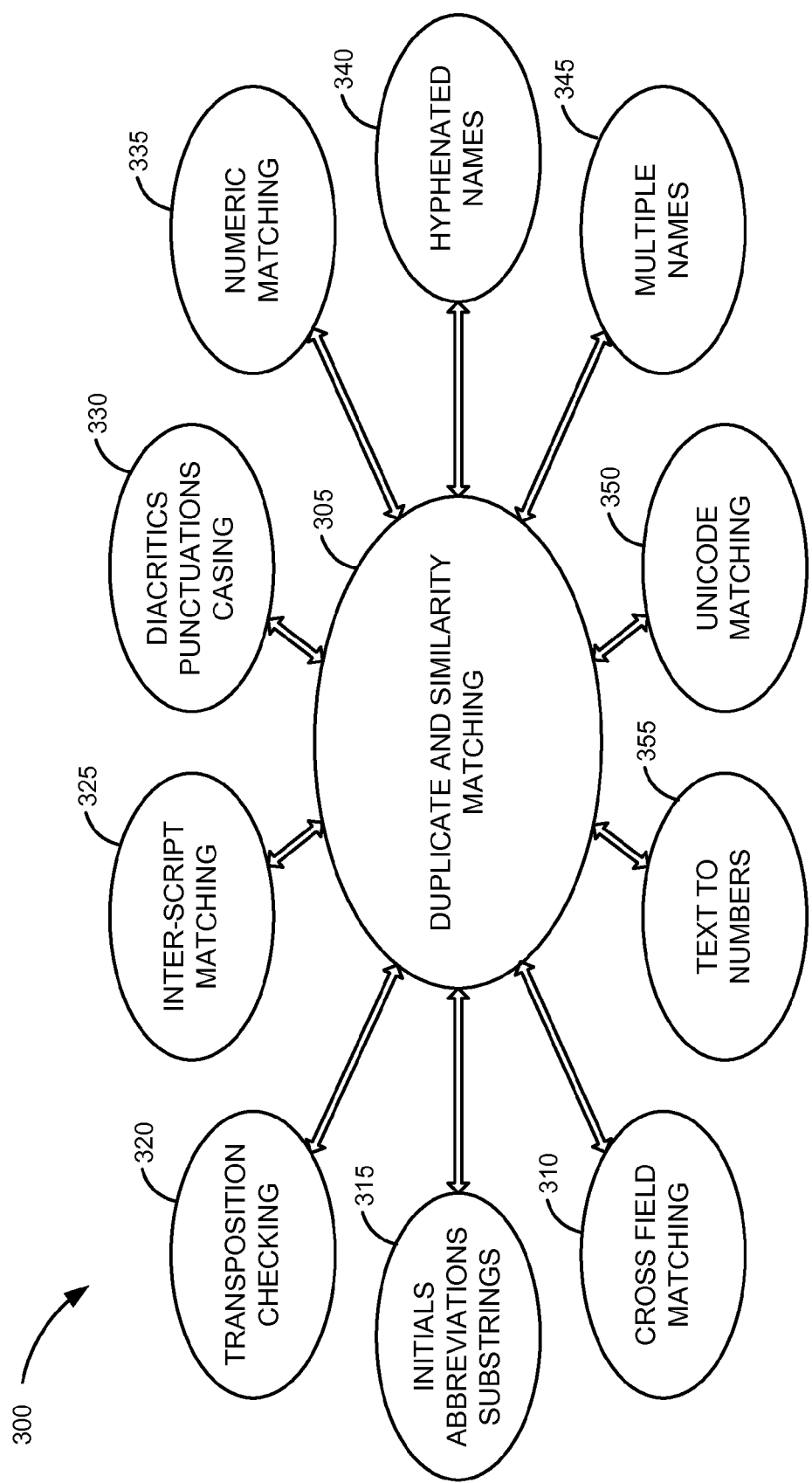
FIG. 3 is a block diagram illustrating a high level structure of a data matching mechanism, according to one embodiment.

Typically, business users define what "duplicate" data and "similar" data is in a given computer system landscape. The applied matching mechanisms use specific algorithms to find the duplicates and similarities based on these business criteria. FIG. 3 shows a high level structure of data matching mechanism 300. The matching or comparison between two or more data elements is evaluated in module 305 by using at least one of the selected algorithms 310 to 355, based on the configuration of the mechanism 300, the nature of the data elements, and the applicable business criteria.

In many cases, direct comparison between the data elements content is not productive. Therefore, the matching algorithms 310 to 355 provide one or more matching options that could be applied in comparing the data elements. Table 1 enlists examples for some of the possible match options supported by the algorithms 310 to 355, together with the issues they solve:

TABLE 1

| Match Option | Example | Value Add |
|---|---|---|
| Cross Field Matching 310 | Compare simultaneously data from different fields, e.g., home phone #, work phone #, mobile phone #, fax # | Data entry errors |
| Initials adjustment 315 | "JR Peterson" matches "James Peterson"; "HP" matches "Hewlett Packard" | Acronyms |
| Abbreviations 315 | "International" matches "Intl" | Entry shortcuts |
| Substrings 315 | "Midtown Power and Light" matches "Midtown Power" or "Midtown Light and Power" | Variations |
| Blank Matching 315 | "John Smith" could match "John" or "Smith", or even "" under certain circumstances | Incomplete data |
| String similarity 315 | "Smith" matches "Smythe" | Spelling errors, typos, variations |
| Word similarity 315 | "John's Plumbing and Hydraulics" matches "John Hydraulics Plumbing" | Out of sequence words |
| Transposition checking 320 | "Simpson" matches "Simspson"; "PO: 43-5654" matches "PO: 34-5654" | Data entry errors |
| Inter-script matching 325 | "Takeda, Masayuki" matches "たけだ, まさゆき"; "Theodōrátou, Eléné" matches "Θεοδωράτου, Ελένη" | Multi-national data; entry variations |
| Diacritics, punctuation, casing 330 | "Senor" matches "Señor"; "MACY'S" matches "macys" | Diacritics, casing variations; exclusion of punctuation |
| Numeric matching 335 | "Accu 1.4 L 29Bar" matches "Accu 29Bar 1.4 L", but does not match "Accu 1.5 L 29Bar" | Enforce numeric accuracy |
| Hyphenated names 340 | "Jones" matches "Jones-Smith" | Household data cleaning |
| Multiple names 345 | "Mary Hill" matches "Jim and Mary Hill" | Household data cleaning |

TABLE 1-continued

| Match Option | Example | Value Add |
|---|---|---|
| Unicode matching 350 | Compare all world data, including nuances | Geographic and cultural coverage |
| China-Japan-Korea-Taiwan matching 350 | Country specific nuances for name, firm, address data; "安十町二丁目 8 番 1 5 号 野村不動産大阪ビル 5F" matches "中央区安十町2 __ 8 __ 1 5 野村不動産大阪ビル 5 階" | Geographic and cultural coverage |
| Text to number matching 355 | "1ˢᵗ" matches "First" | Data entry variations |

In many occasions, data elements containing numeric characters are compared simply as characters. For example, the numeric matching algorithm 335 checks the exact match between numeric characters. Similarly, the text to number matching algorithm 355 converts words to numbers which are then compared for character match. However, it is often necessary for the closeness between numbers in two or more data elements to be evaluated, e.g., between two or more data strings. A match between the data strings or elements may be identified when the numerical difference between one or more corresponding numbers in the strings is less than a predefined value. Thus, referring to the examples in Table 1, strings "Accu 1.4L 29Bar" and "Accu 1.5L 29Bar" may be identified as duplicate when a numerical difference of 0.1 is tolerable.

In one embodiment, a strings matching algorithm based on numeric closeness is applied by a matching mechanism in a computer system landscape. Instead of considering only the actual characters in similarity match, this strings matching algorithm compares the number values of numerical strings. A maximum number of differences allowed could be specified, and a base match score may be evaluated by the algorithm, accordingly. In one embodiment, a matching score from 0 to 100 is evaluated based on the actual numeric difference between two numbers and the base match score for the maximum allowed difference. The string matching algorithm may also provide options for adjusting the match score based on whether alpha characters are included in the input data elements, as well as other data quality checks and adjustments may be performed.

The traditional match algorithms for comparing data strings, e.g., "edit distance" algorithms, give match results or scores that are not specialized for dealing with numeric data. For example, many money rebates have a one-per-household limit. Sometimes, persons are trying to fraudulently obtain multiple rebates from a company by sending multiple rebate submissions with slightly altered data, e.g., "John Smith, 39 Main St" and "John Smith, 41 Main St". In this instance, "41" might be a fictional house number, but, because it is close enough in proximity, it is very likely that the mail carrier will still deliver rebate check to John Smith. The strings "39" and "41" normally have a very small matching score when compared using a conventional "edit distance" algorithm, and hence, the fraudulently duplicated record may not get detected. However, when a string matching algorithm based on numeric difference is applied, the proximity between numbers "39" and "41" will be identified, and the duplicate submissions will be detected.

The above example shows how important is the ability to match data elements based on their value proximity instead of simply comparing their string representation. The transformation of data strings to their numerical value may be helpful to evaluate not only number closeness, but also other types of proximity. For example, the same approach can be used in finding geographical proximity between two or more locations described by numerical coordinates. The difference between two records specifying geographical locations may be calculated and measured in miles, meters, etc. Thus, duplicate or similar addresses could be detected in one or more data records, for example. Proximity between dates also can be evaluated using the numerical recordings of dates. Thus, duplicate data records may be detected based on date ranges, e.g., periods of days.

Figure 4:
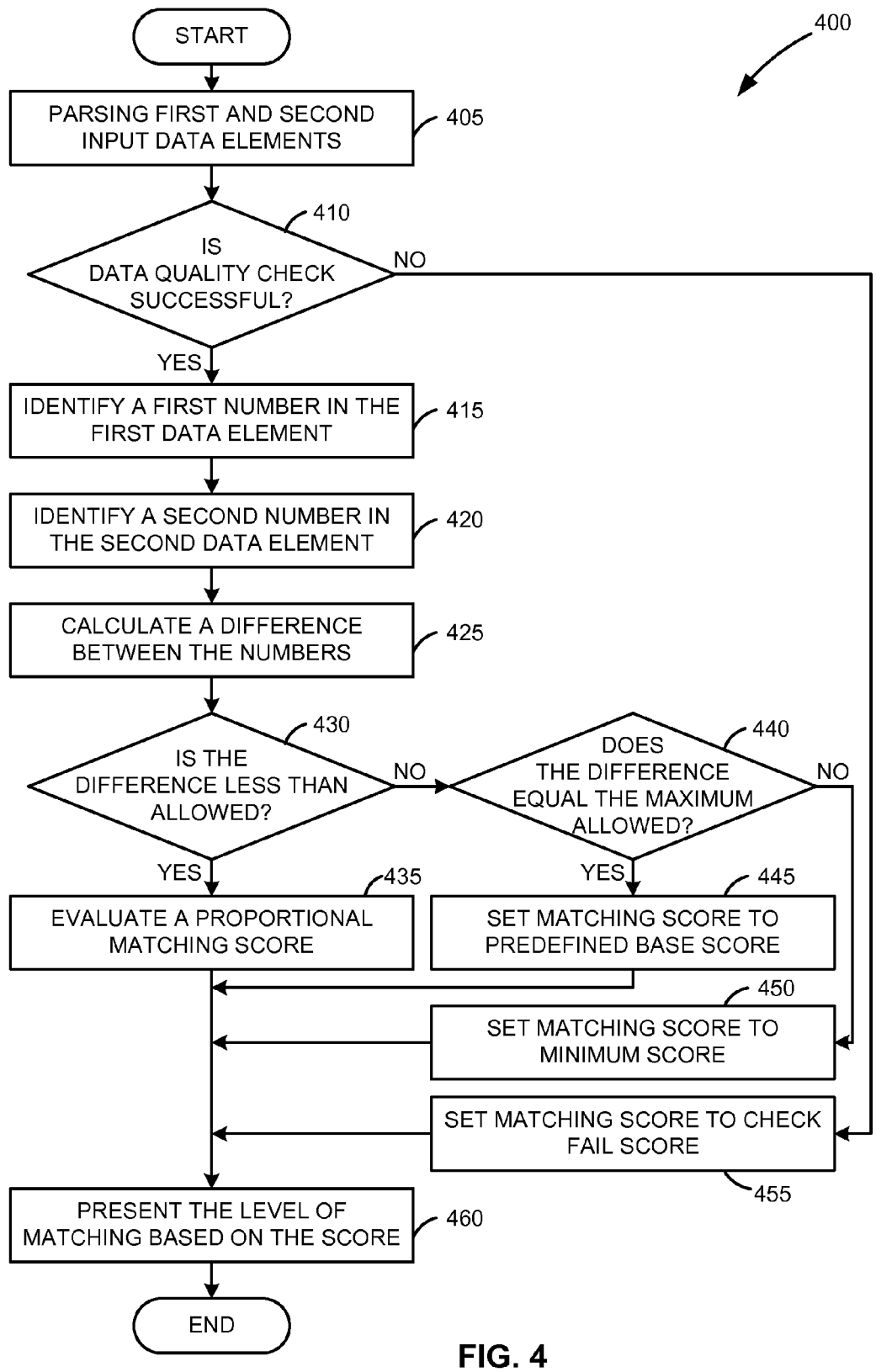
FIG. 4 is a flow diagram illustrating a process for comparing data elements based on numerical difference, according to one embodiment.

FIG. 4 shows process 400 for comparing data elements by evaluating proximity based on numerical difference, according to one embodiment. At 405, first and second input data elements are parsed. In one embodiment, the first and second data elements may be part of one or more data strings. The goal for the parsing is mainly to look up numerical characters in the strings. In one embodiment, the parsing may also include data quality check. The data quality check may help identifying invalid data according to predefined criteria. For example, invalid data could be defined to include non-numeric characters (e.g., data string "N882" has a non-numeric character "N"), invalid numeric fractions (e.g., "1", "/2", "123 3/2"), different string lights (e.g., "453772" and "45377"), etc. At 410, it is verified whether the data quality check is successful, e.g., whether the data quality of the input data elements is confirmed.

When the data quality check is successful, the process 400 continues at 415 with identifying a first number in the first data element. Different approaches for identification of a number in a data element may apply. For example, an algorithm may convert all numeric characters of the data element to a single number. Alternatively, only a subset of numeric characters may be selected to be converted to a number, where the subset may have a predefined cardinality. The non-numerical or invalid characters in the data element, if any, could be ignored or replaced by numbers according to an established set of rules, e.g., non-numeric character could be ignored, and invalid numeric fraction could be replaced with zero. A similar operation for identifying a second number is performed for the second data element at 420.

At 425, a difference between the identified numbers is calculated. In one embodiment, different mathematical expressions could be used for calculating the difference between the numbers. For example, when the first and the second numbers are treated as simple values, the difference may be calculated by the absolute arithmetical subtraction of one of the numbers from the other.

However, there are situations in which the difference calculated at 425 is a result of a more complex mathematical function, where the first and the second numbers are included as parameters. For example, the first number and the second number may correspond to geographical coordinates, e.g., to longitude and/or latitude. In such a case, the difference between the two input data elements may correspond to a distance between two or more geographical locations. A special function could be applied to calculate the difference between the first and the second numbers in terms of a geographical distance, e.g., "Haversine formula". According to another example, the identified first and second numbers may correspond to calendar dates. Then, the difference between the numbers may be calculated as a period of times between the dates, e.g., measured in months, days, hours, etc.

At 430, a check is performed whether the difference between the numbers is less than allowed, e.g., less than a predefined maximum value. Depending on the kind of data that is compared, the maximum allowed difference specifies a threshold for the matching algorithm. In one embodiment, a highest matching score between the two data elements is achieved when there is no difference between the identified numbers. When the difference is less than the allowed, the matching score is evaluated at 435 based on the proportion between the calculated value and the maximum allowed value of the difference.

At 440, a check is performed whether the difference equals the maximum allowed value. If the difference equals the allowed level, the matching between the two data elements is at the threshold. At 445, the matching score is set to a base score corresponding to the maximum allowed difference. When the calculated difference between the identified first and second numbers is greater than the maximum allowed, the matching score is set to a minimum score at 450, e.g. set to zero. The minimum matching score corresponds to absence of proximity that suggests a match between the input data elements. In one embodiment, the matching score is set to another predefined value at 455, e.g. a fail score, when the data quality check is not successful. The process 400 ends at 460 with presenting the level of matching between the first data element and the second data element based on the evaluated matching score.

In one embodiment, the difference between the identified numbers could be calculated in two parts at 425. A first difference between the first number and a predefined "master" value, and a second difference between the second number and the predefined "master" value are initially calculated. Then the difference between the numbers is calculated as a function of the first difference and the second difference. For example, the difference between the numbers may equal the greater of the first difference and the second difference. Thus, data elements with small mutual proximity, but with high proximity to a third data element may be detected as matching. For example, let the data elements correspond to metal rods with different lengths. It may be defined that rods with difference in their length less than 3 mm are identical. However, it may also be defined that all rods with length within 3 mm from the length of a given "master" rod are identical as well. Then if a first rod is 3 mm longer than the "master" rod, and the second rod is 2 mm shorter than the "master" rod, the first and the second rods will still be treated as identical despite the difference of 5 mm between them.

An exemplary embodiment of the described algorithm could be found in "Data Services" application provided in SAP BusinessObjects™ platform of SAP AG. A numeric difference match algorithm (NDMA) is integrated into "Match Transform" functionality of the "Data Services" product, and is used to determine the proximity between two or more string data elements containing numeric characters. The algorithm may return the resulting matching score in a user-specified manner. The variants of the NDMA for determining proximity between numbers, geographical locations, dates, etc. are available as alternative options in the "Data Services". In one embodiment, option characteristics of the different variants of the NDMA could be specified by a user in a "Match Editor" interface of the "Data Services" application. The specified options could be saved in Extensible Markup Language (XML) format in a dataflow used by the "Data Services". When data elements (e.g., data records, data fields) are compared, a NDMA object is instantiated as specified. The NDMA objects execute or invoke appropriate programming code for generating matching scores.

In one embodiment, the Numeric Difference Match Algorithm involves several option parameters for adjusting match scores in different scenarios. The "MAX_DIFFERENCE" attribute option specifies the maximum difference allowed. Any difference greater than the "MAX_DIFFERENCE" will receive a minimum matching score of "0". A difference that equals the "MAX_DIFFERENCE" will receive a score of "MAX_DIFFERENCE_SCORE". Any difference less than "MAX_DIFFERENCE" will receive a proportional score between "MAX_DIFFERENCE_SCORE" and maximum score of "100". The valid values for the "MAX_DIFFERENCE" attribute may range from "0" to "MAX_UNIT". The valid values for the "MAX_DIFFERENCE_SCORE" attribute may range from 0 to 100. For example, suppose the "MAX_DIFFERENCE" is 10 and the "MAX_DIFFERENCE_SCORE" is 80. Table 2 shows the scores that could be generated depending on the calculated difference:

TABLE 2

| Difference | Score |
| --- | --- |
| 0 | 100 |
| 1 | 98 |
| 2 | 96 |
| 3 | 94 |
| 4 | 92 |
| 5 | 90 |
| 6 | 88 |
| 7 | 86 |
| 8 | 84 |
| 9 | 82 |
| 10 | 80 |
| 11 | 0 |
| 12 | 0 |
| ... | |

In general, a proportional matching score may be calculated by using the following rules:
1) When the calculated difference is greater than "MAX_DIFFERENCE":
   matching score="0"
2) When the calculated difference equals "MAX_DIFFERENCE":
   matching score="MAX_DIFFERENCE_SCORE"
3) When the calculated difference is less than "MAX_DIFFERENCE":

matching score = "MAX_DIFFERENCE_SCORE" +

(((100 − "MAX_DIFFERENCE_SCORE")/"MAX_DIFFERENCE") *

("MAX_DIFFERENCE" − calculated difference))

These rules allow evaluation of a proportional matching score between the "MAX_DIFFERENCE_SCORE" and "100" based on the actual difference value calculated within the tolerance of "MAX_DIFFERENCE". The "MAX_DIFFERENCE" defines the maximum difference between two data elements beyond which the matching score is set to "0".

In one embodiment, "DATA_QUALITY_CHECK" options are provided in the Numeric Difference Match Algorithm to handle situations where invalid data is encountered in any of the data items to be compared. The execution of this part of the NDMA may be optional, and could be repeated over the input data elements. The "DATA_QUAL-ITY_CHECK" attribute "CHECK/TYPE" specified what kind of invalid data to check for. For example, valid values for this attribute are:

"NON-NUMERIC_CHAR" check—looks for a non-numeric character in the numeric value, e.g., "N882" has a non-numeric character "N". If this check is omitted, then non-numeric characters are treated as number separators "INVALID_FRACTION" check—looks for improper fraction expressions, e.g., "1/", "/2", "123 3/2". If this check is omitted, the invalid fractions are treated as having a value of "0"

"DIFFERENT_LENGTH" check—looks for two numeric strings that have different lengths, e.g., "453772" and "45377". If this check is omitted, then the numbers to be compared are allowed to be with different lengths "MULTIPLE_NUMBERS" check—when more than one number is identified in one of the strings to be compared. In one embodiment, if the "MULTIPLE_NUMBERS" option is "on", it means that, if either data element has more than one number in it, the data quality check fails. Otherwise, multiple numbers are allowed. So, for example, if one of the elements has "N123 346" this would not be allowed to pass (e.g., based on a real example, there are street number ranges that have multiple number parts like that).

"DIFFERENT_COUNT"—if this option is "on" it means that each data element must have the same count of numeric words. Hence, related to the example above, if multiple numbers are allowed, this option says that both data elements must have the same quantity of number words. For example, it is acceptable if "Element1"="N123 456", and "Element2"="N124 456", and it is not acceptable if Element1"="N123 456", and "Element2"="N124 456 789".

"EXTRA_NON-NUMERIC" check—looks for a non-common non-numeric character (e.g., "N882" and "882"). If this check is omitted, then extra non-numeric characters are ignored "NON-NUMERIC_NO_MATCH" check—looks for a non-numeric character that is not the same in both numeric values (e.g., "N882" and "5882"). If this check is omitted, then non-numeric characters do not have to match Another attribute of "DATA_QUALITY_CHECK" is "CHECK/SCORE" that specifies what score to return if the invalid data specified in the "CHECK/TYPE" attribute is encountered. In one embodiment, the valid values for this required attribute can range from 0 to 100. In general, the optional data quality checks allow for adjustments in the numeric difference match algorithm scoring for various special cases.

Figure 5:
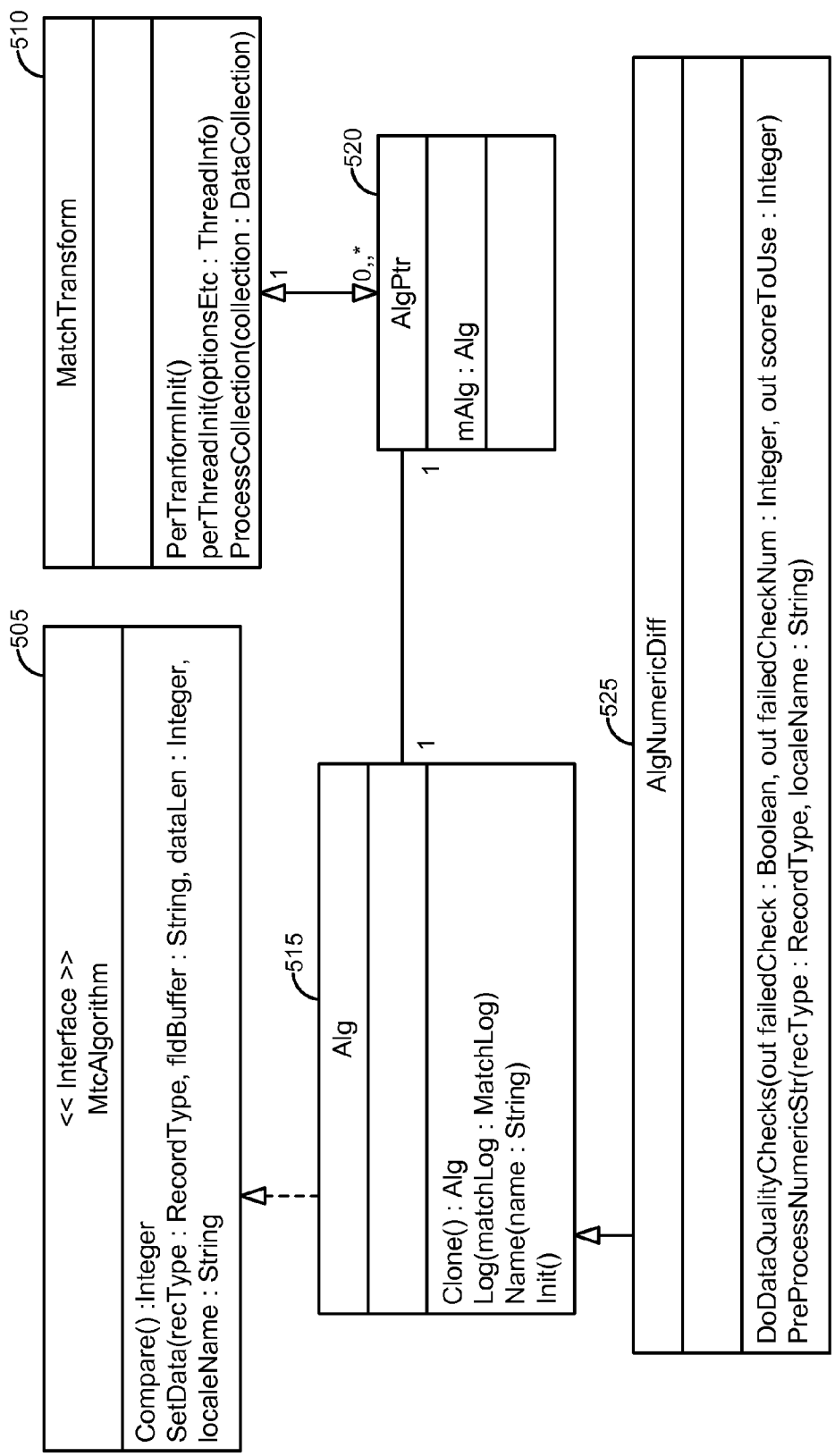
FIG. 5 is a block diagram illustrating an implementation of a Numeric Difference Match Algorithm, according to one embodiment.

FIG. 5 is a block diagram 500 that shows an exemplary implementation of the Numeric Difference Match Algorithm in the framework of the "Data Services" application, according to one embodiment. The "Match Transform" class 510 contains a number of algorithm objects that are defined for the selected data elements to be compared. The algorithm objects implement a "MtcAlgorithm" interface 505, which provides "SetData( )" method for configuring the data elements to be compared and "Compared( )" method which may return a matching score between 0 and 100. Further, methods provided in general "Alg" class 515 could be overridden by specific algorithm objects "AlgPtr" 520 based on the selected compare options. The specific algorithm objects "AlgPtr" 520 could be created through "Match Transform" class 510 by using its "Init" methods, and by calling the "SetData( )" and "Compared( )" methods from its "ProcessCollection( )" method.

Table 3 shows a sequence of operations to illustrate the functionality of "Match Transform" 510 using algorithm objects:

TABLE 3

| Order | Operation | Description |
| --- | --- | --- |
| 1 | PerTransformInit( ) | gets invoked by the DS platform |
| 2 | Call SaveSettings( ) | With transform options |
| 3 | Get object | Get algorithm object from settings, if any |
| 4 | Create "AlgNumericDiff" | Create one or more defined "AlgNumericDiff" objects 525 |
| 5 | Pass | Pass "logfile ptr" of "Match Transform" to "AlgNumericDiff" objects |
| 6 | Pass options | Pass and numeric difference options settings to each AlgNumericDiff object and invoke "SaveSettings( )" method |
| 7 | Save pointers | "Match Transform" saves a map of pointers to any algorithm objects to use later from ProcessCollection( ) |

The Numeric Difference Match Algorithm could be applied to compare a number of data elements contained in an input set of data elements. For example, the set of data elements could be a data record, or a data string. In this case, the input data string could be parsed in order to identify a number of separate data elements, e.g., words. The words could be then compared with each other to evaluate matching scores. For a better understanding, the input data string could be illustrated as a list of bus passengers, where one or more of the passengers is a bus driver. Every passenger entry in the list may have different names, and one or more numbers assigned as identifier (ID). A comparison between the passengers using NDMA could be accomplished to identify matching scores between the IDs of the passengers and drivers.

Referring back to FIG. 4, the parsing of the first and second data elements may be accomplished whenever "SetData( )" is called from the "MatchTransform" class. The input data string is preprocessed, and the numbers found are saved in the NDMA algorithm object either as driver or as passenger words. Further, Table 4 contains an exemplary pseudo-code listing of the process sequence the "Match Transform" invokes corresponding to the Numeric Difference Match Algorithm. The comparison eventually takes place after "ProcessCollection( )" method is called by the "Data Services" platform:

TABLE 4

Pseudo-code listing

```
// Algorithm compare defined?
if (algorithm != 0)
{
    // Let the algorithm knows about any new data.
    // Note: only call SetData( ) when the data actually
    // changes because a driver will likely be compared to many
    // passengers, so there is no need change the input driver
    //data element until the corresponding word is changes
    if (newDriverData)   //Change?
    {
        // Set the data.
        algorithm.SetData(
            RecordTypeDriver,
```

TABLE 4-continued

Pseudo-code listing

```
            driverBuffer,
            datalen,
            localeName);
    }
    if (newPassengerData)    //Change?
    {
        // Set the data.
        algorithm.SetData(
            RecordTypePassenger,
                passengerBuffer,
                datalen,
                localeName);
    }
    -----
    // Compare the field between the driver and passenger
    score = algorithm.Compare( );
```

The "Compare( )" method is invoked by the "MatchTransform" to perform the rest of the actions presented in FIG. 4. The following Table 5 enlists a pseudo-code example of an embodiment of the matching algorithm showing the operations corresponding to the "Compare( )" method:

TABLE 5

Pseudo-code listing

```
CalculateScore(
        Boolean isFailedCheck [OUT],
        Integer dqCheckNum [OUT],
        Integer scoreToUse [OUT])
{
scoreToUse = 0;
// Check for a number word in both passenger and driver
if (!driver.numWord OR !pass.numWord)
{
        return; // scoreToUse is 0
}
// Do the data quality checks, if any
DoDataQualityChecks(isFailedCheck, dqCheckNum, scoreToUse);
// if we failed the checks then we are done. We use the score
// returned from the check call.
if (isFailedCheck)
{
  return;
}
// find the actual difference between the driver and passenger
Double actualNumDifferences = 0.0;
/*
* 1)     actual # differences > MAX_DIFFERNCE -> match score = 0
*
* 2)     actual # differences =
*        MAX_DIFFERENCE -> match score =
*        MAX_DIFFERENCE_SCORE
*
* 3)     actual # differences <MAX_DIFFERENCE-> match score =
*
*   MAX_DIFFERENCE_SCORE +
*     (((100 - MAX_DIFFERENCE_SCORE) /
*     MAX_DIFFERENCE) * (MAX_DIFFERENCE - actual #
        differences))
*/
// condition 1) from above ? if so score -> 0
if (actualNumDifferences > mMaxDifferencesAllowed)
{
  scoreToUse = 0;
}
//condition 2) from above? if so score ->
MAX_DIFFERENCE_SCORE
else if (actualNumDifferences == mMaxDifferencesAllowed)
{
  scoreToUse = mMaxDifferenceScore;
}
// 3) from above apply the formula --
//     actualNumDifferences , mMaxDifferencesAllowed
```

TABLE 5-continued

Pseudo-code listing

```
else
{
  scoreToUse = maxDifferenceScore +
            (((100.0 - maxDifferenceScore) /
                maxDifferencesAllowed) *
            (maxDifferencesAllowed - actualNumDifferences));
}
}
```

Figure 6:
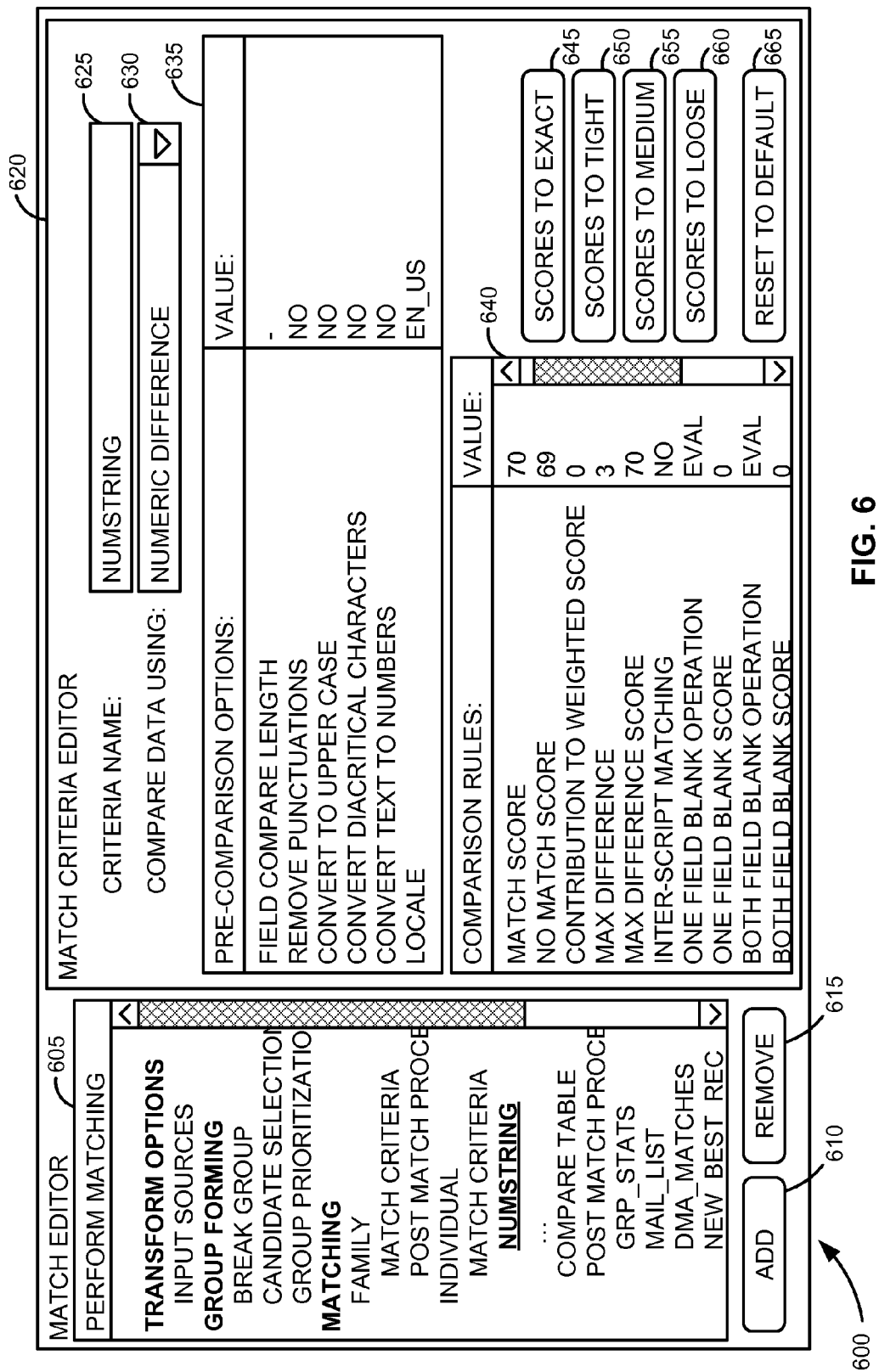
FIG. 6 illustrates a user interface of a data matching mechanism, according to one embodiment.

FIG. 6 illustrates match editor UI 600 of "Data Services" application, according to one embodiment. The match editor UI 600 provides means for configuring the implemented matching mechanism according with established data management objectives or goals:
  Data argumentation with Break Groups;
  Candidate Selection for pulling in external sources;
  Multi-level matching, e.g., Family, Individual, etc., for addressing hierarchical relationships;
  Criteria matching on multiple sources and fields;
  Match algorithm options based on numerous configurable Comparison Rules;
  Controlling comparison of scores, e.g., by using Compare Table, etc.;
  Post Match Processing, including creating match statistics, generating best record, assigning unique identifiers, etc.;
  Global matching options; etc.

The match editor UI 600 is divided in several areas corresponding to different configuration contexts. For example, in "perform matching" area 605 the matching criteria could be selected. As illustrated in FIG. 6 by underlining, "NUMSTRING" matching criteria is selected. Buttons "Add" 610 and "Remove" 615 help adding new items in "perform matching" area, e.g., adding new or removing existing matching criteria.

In "match criteria editor" area 620 of match editor UI 600, the characteristics of the criteria selected in "perform matching" area 605 could be defined. For example, criteria name could be changed in text box control 625. An appropriate compare algorithm to be used by the criteria could be selected from drop-down control 630. A number of editable parameters presented in table 635 may specify a set of pre-comparison options, e.g., whether to perform pre-processing data operations of the input data elements. Table 640 enlists a set of comparison rules pertinent to the selected match algorithm. In one embodiment, buttons 645 to 665 help managing the parameter values associated with the set of comparison rules.

Based on the selected compare algorithm, the table 640 is filtered to show an appropriate set of options. As illustrated by FIG. 6, the "Data Services" application is set to compare data using "Numeric Difference" algorithm. A difference equals to "Max Difference" parameter will receive a score of "Max Difference Score". Any difference less than "Max Difference" will receive a proportional score between "Max Difference Score" and 100. Accordingly, "3" units difference will have a higher score than "8" units. The "No Match Score" parameter should be set to less than "Max Difference Score" Otherwise, even data elements within the range will not be found as duplicates. In the given example, data elements with difference lower than "3" units will be considered matching, and corresponding match scores will be evaluated. The matching score may be evaluated as a percent difference between the numeric values of the compared data elements.

The match editor UI 600 could be used to specify different applications of the NDMA for evaluating proximity between data elements. Similar to numerical difference match, geographical proximity could be evaluated based on latitude and longitude information, or Global Positioning System (GPS) coordinates. For example, new criteria could be added or selected in "perform matching" area 605. Then, in the "match editor" area 620, an appropriate algorithm to compare data elements could be selected from the drop-down control 630. In one embodiment, the selected algorithm applies the same approach for identifying and matching numeric data used by the NDMA, but instead of directly calculating the numerical difference between the data elements, an appropriate function for geographical proximity is applied (e.g. Haversine formula).

When the appropriate algorithm for evaluating geographical proximity is selected in the drop-down control 630, the corresponding option parameters may be loaded in the "Pre-Comparison Options" table 635 and in "Comparison Rule" table 640. The basic parameters that are necessary for evaluating matching score are defined. For example, "Max Difference" parameter may be specified as maximum allowed distance between two matching geographical locations, e.g., 10 miles. Respectively, corresponding "Max Difference Score", "Match Score" and "No Match Score" are specified.

Another algorithm based on the NDMA could be applied for evaluating matching score for dates. For example, the dates in a particular range of days (period) could be treated as duplicate. The dates to be compared are identified in the input data elements, e.g., by converting the data types of subsets of numerical characters selected from the input data elements.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
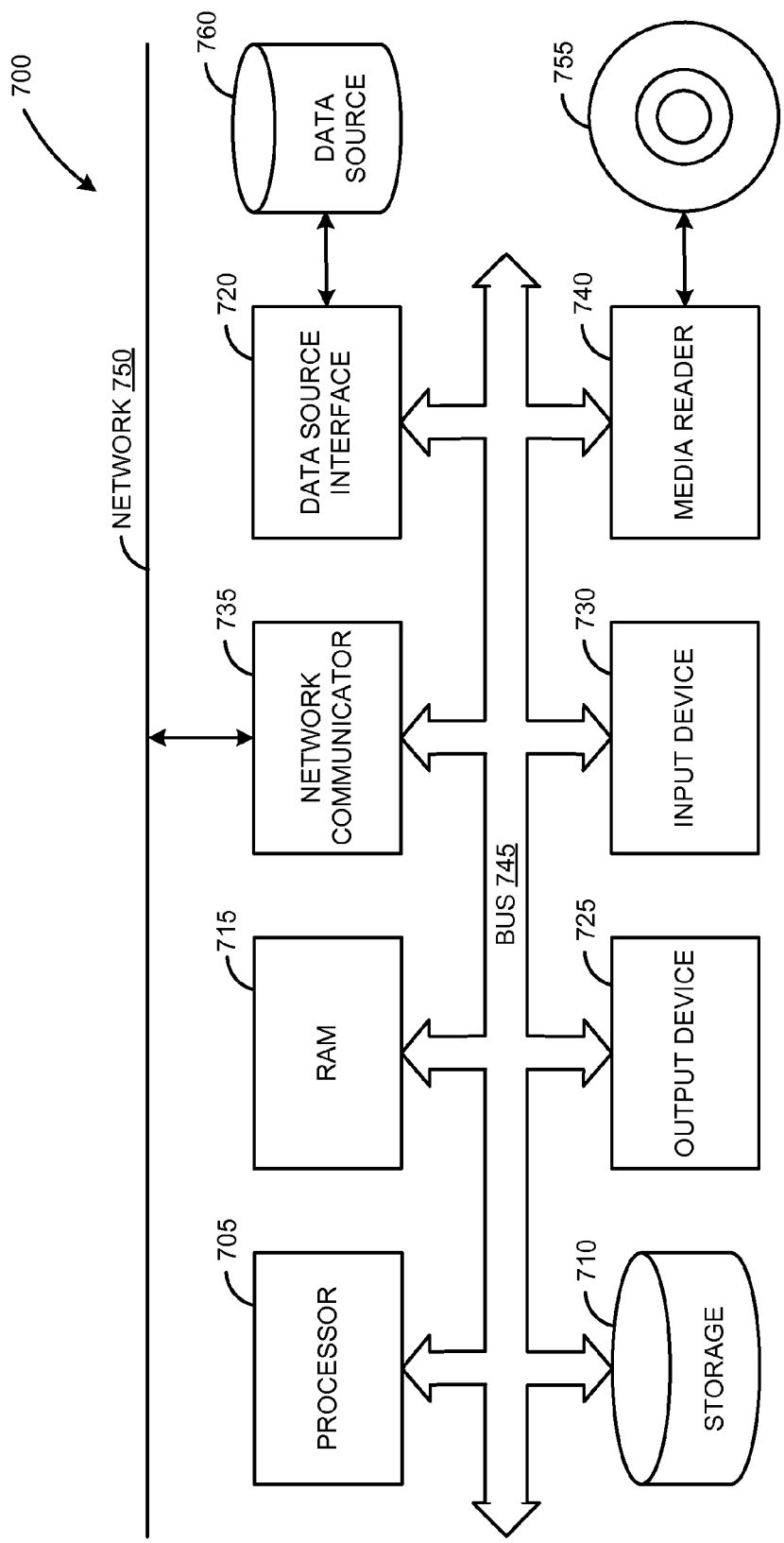
FIG. 7 is a block diagram of an exemplary computer system to execute data matching based on numeric difference, according to one embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed via network 750. In some embodiments the data source 760 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer system for matching data based on numeric difference, the computer system comprising a processor, the processor communicating with one or more memory devices storing instructions, the instructions operable to:
    receive a first data element from a first data source of multiple data sources communicatively accessible at said computer system, wherein said multiple data sources include one or more data sources selected from a group consisting of a file, a database table and an electronic message;
    receive a second data element from a second data source of said multiple data sources;
    parse said first data element to identify and convert numeric characters to a first number, wherein said first number includes at least one digit;
    parse said second data element to identify and convert numeric characters to a second number, wherein said second number includes at least one digit;
    at a runtime environment of said computer system, generate a matching score based on a numeric difference between the magnitudes of said first number and said second number, wherein said numeric difference is calculated at said computer system based on metadata accessible by said runtime environment; and
    consolidate said first data element with said second data element into a master record when said matching score is greater than or equal to a base score, wherein said master record includes information selected from one or more of said first data element and said second data element based on one or more priorities selected from a group consisting of source, frequency, completeness and recency.

2. The system of claim 1, wherein generating said matching score further comprises:
    calculating said numeric difference based on a predefined proximity formula.

3. The system of claim 1 further comprising:
    assigning said matching score to said base score when said numeric difference equals a threshold value;
    assigning said matching score to a maximum score when said numeric difference is zero; and
    assigning said matching score to a proportional value between said base score and said maximum score when said numeric difference is between said threshold value and zero.

4. The system of claim 1, wherein generating said matching score comprises:
    calculating a first numeric difference between the magnitudes of said first number and a predefined master value;
    calculating a second difference between the magnitudes of said second number and said predefined master value; and
    evaluating said matching score based on said first numeric difference and said second numeric difference.

5. An article of manufacture including non-transitory computer readable storage medium to tangibly store instructions for matching data based on numeric difference, which when executed by a computer, cause the computer to:
    receive a first string from a first data source of multiple data sources communicatively accessible at said computer, wherein said multiple data sources include one or more data sources selected from a group consisting of a file, a database table and an electronic message;
    receive a second string from a second data source of said multiple data sources;
    parse said first string to identify and convert at least one numeric character to a first number;
    parse said second string to identify and convert at least one numeric character to a second number;
    at a runtime environment of said computer, generate a matching score based on a numeric difference between the magnitudes of said first number and said second number, wherein said numeric difference is calculated at said computer based on metadata accessible by said runtime environment;
    report a level of similarity between said first string and said second string based on said matching score according to a base score; and
    consolidate said first string and said second string into a master record when said matching score is greater than or equal to a base score, wherein said master record includes information selected from one or more of said first string and said second string based on one or more priorities selected from a group consisting of source, frequency, completeness and recency.

6. The article of manufacture of claim 5, wherein parsing said first string comprises:
    interpreting at least one non-numeric character of said first string as a separator between numbers.

7. The article of manufacture of claim 5, wherein parsing said first string comprises:
    performing quality check to determine invalid data in said first string according to predefined criteria; and
    upon determining, replacing an invalid numerical fraction with at least one predefined numerical character.

8. The article of manufacture of claim 5, wherein generating said matching score further comprises:
calculating said numeric difference based on a formula corresponding to information type of said at least one numerical character of said first string.

9. The article of manufacture of claim 5, wherein the non-transitory computer readable storage medium tangibly stores further instructions, which when executed by the computer cause the computer to:
assign said matching score to said base score when said numeric difference equals a threshold value;
assign said matching score to a maximum score when said numeric difference equals or is less than a minimum value; and
assign said matching score to a proportional value between said base score and said maximum score when said numeric difference is between said threshold value and said minimum value.

10. The article of manufacture of claim 5, wherein the non-transitory computer readable storage medium tangibly stores further instructions, which when executed by the computer cause the computer to:
assign said matching score to a minimum score when said numeric difference is greater than a threshold value.

11. The article of manufacture of claim 5, wherein generating said matching score comprises:
calculating a first numeric difference between the magnitudes of said first number and a predefined master value;
calculating a second numeric difference between the magnitudes of said second number and said predefined master value; and
evaluating said matching score based on said first numeric difference and said second numeric difference.

12. The article of manufacture of claim 5, wherein reporting the level of similarity between said first string and said second string comprises:
displaying a message indicating duplicate data when said matching score is greater than or equal to said base score.

13. A computer implemented method for matching data based on numeric difference comprising:
loading a first string in a computer memory from a first data source of multiple data sources, wherein said multiple data sources include one or more data sources selected from a group consisting of a file, a database table and an electronic message;
loading a second string in said computer memory from a second data source of said multiple data sources;
parsing said first string to identify and convert numeric characters to a first number;
parsing said second string to identify and convert numeric characters to a second number;
generating by a processor coupled to said memory a matching score based on a numeric difference between the magnitudes of said first number and said second number, wherein said numeric difference is calculated at said computer based on metadata accessible by said processor;
indicating a level of correspondence between said first string and said second string based on said matching score according to a base score; and
consolidating said first string and said second string into a master record when said matching score is greater than or equal to a base score, wherein said master record includes information selected from one or more of said first string and said second string based on one or more priorities selected from a group consisting of source, frequency, completeness and recency.

14. The method of claim 13, wherein parsing said first string comprises:
removing at least one non-numeric character from said first string.

15. The method of claim 13, wherein parsing said first string comprises:
performing quality check to determine invalid data in said first string according to predefined criteria; and
upon determining, replacing at least one invalid numeric expression with at least one predefined numerical character.

16. The method of claim 13, wherein generating said matching score further comprises:
calculating said numeric difference based on a formula corresponding to a proximity selected from a group consisting of numerical proximity, geographical proximity and date proximity.

17. The method of claim 13 further comprising:
assigning said matching score to said base score when said numeric difference equals a threshold value;
assigning said matching score to a maximum score when said numeric difference is at minimum value; and
assigning said matching score to a proportional value between said base score and said maximum score when said numeric difference is between said threshold value and said minimum value.

18. The method of claim 13 further comprising:
assigning said matching score to a minimum score when said numeric difference is greater than a threshold value.

19. The method of claim 13, wherein generating said matching score comprises:
calculating a first numeric difference between the magnitudes of said first number and a predefined master value;
calculating a second numeric difference between the magnitudes of said second number and said predefined master value; and
evaluating said matching score based on said first numeric difference and on said second numeric difference.

20. The method of claim 13, wherein indicating a level of correspondence between said first string and said second string comprises:
consolidating said first string and said second string to a third string when said matching score is higher than said base score, wherein said third string includes information selected from one or more of said first string and said second string based on one or more priorities selected from a group consisting of source, frequency, completeness and recency; and
deleting said first string and said second string.

* * * * *